July 1, 1941.  R. T. REARDON  2,247,890
CORE FOR ELECTRICAL APPARATUS
Filed Jan. 26, 1940
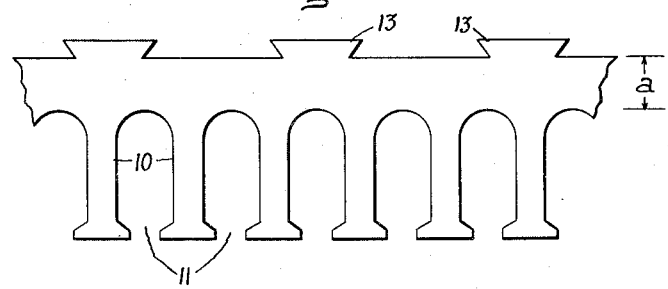
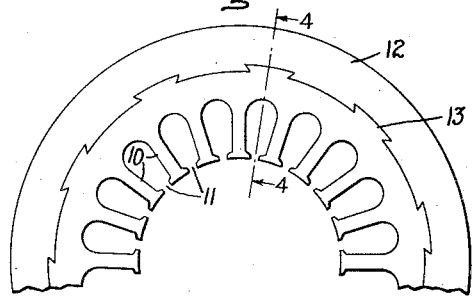
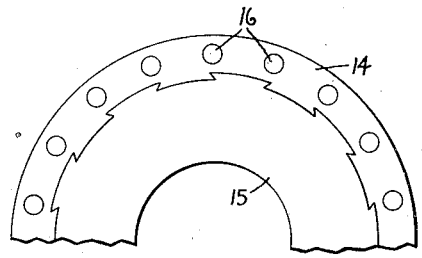
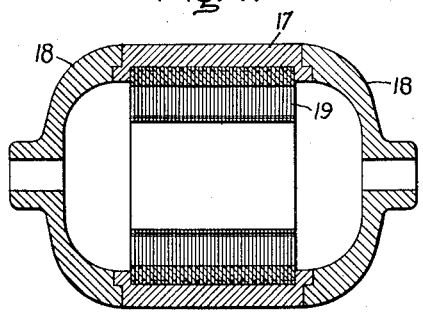
Inventor:
Robert T. Reardon,
by Harry E. Dunham
His Attorney.

Patented July 1, 1941

2,247,890

UNITED STATES PATENT OFFICE 2,247,890

CORE FOR ELECTRICAL APPARATUS

Robert T. Reardon, Fort Wayne, Ind., assignor to General Electric Company, a corporation of New York Application January 26, 1940, Serial No. 315,799

13 Claims. (Cl. 171—252)

My invention relates to electrical apparatus and more particularly to dynamo-electric machines and to cores therefor.

In cores for dynamo-electric machines or other electrical apparatus, where the windings are placed in slots which are formed by teeth at the edge of the core member, the core member usually is formed of a number of laminated sheets of ferro-magnetic material. It has been suggested to form the core member of a dynamo-electric machine or other electrical apparatus, of an edgewise wound thin strip of ferro-magnetic material with teeth in one edge thereof wound in the form of a fine-pitch helix with the teeth substantially in axial alignment. I have found, however, that when such a core is edgewise wound the outer periphery is stretched thin and the inner periphery is thickened and has an excess or buildup of material, with the result that the core is thin at the outside and thick or buckled at the root of the tooth. This results in a stator core which is spongy and has a poor space factor.

An object of my invention is to form a core for dynamo-electric machine or other electrical apparatus which has a portion thereof formed of edgewise wound magnetic material, and which provide a substantially rigid core.

Another object of my invention is to provide an improved core for electrical apparatus having a laminated portion and a powdered iron portion.

Further objects and advantages of my invention will become apparent from the following description referring to the accompanying drawing, and the features of novelty which characterize my invention will be pointed out with particularity in the claims annexed to and forming a part of this specification.

In the accompanying drawing Fig. 1 is a fragmentary view illustrating a strip of ferro-magnetic material for forming cores by edgewise winding; Fig. 2 is a partial end elevation of a stator core provided with an embodiment of my invention; Fig. 3 is a partial end elevation of a rotor core provided with an embodiment of my invention; and Fig. 4 is a sectional side elevation of a stator of a dynamo-electric machine provided with a modification of my invention. In the arrangement illustrated in the drawing, I have provided an edgewise wound strip of magnetic material which has a radial depth which is only sufficient to form a mechanically rigid structure at the root of the teeth. To form the remainder of the core member a powdered iron yoke portion is formed which is magnetically and mechanically associated with the edgewise wound strip portion. When the edgewise wound portion of the core member has this reduced radial depth, it will be seen, therefore, that there will be a much less tendency for any excess of material to be formed at the inside and a corresponding thinning of material at the outside.

Referring to the drawing, in Fig. 1 I have shown a strip of hot-rolled steel with teeth 10 and slots 11 along one of its edges. This steel may be of any suitable type such as 2½% to 3½% silicon steel. This strip may be used to form a core of a dynamo-electric machine or other electrical apparatus by edgewise winding the strip in the form of a fine-pitch close wound helix. It will be seen that the radial depth $a$ of the strip shown in Fig. 1 is much narrower than that ordinarily used in constructions heretofore known. The radial depth $a$ of the strip is only sufficiently large enough to form a mechanically rigid structure at the root of the teeth. As has already been pointed out, the reducing of the radial depth of the strip which is edgewise wound greatly lessens the tendency of any excess or buildup of material at the inner periphery of the helix and a diminution of material at the outer periphery of the helix. In order to make up the amount of ferro-magnetic material which is lost due to the lessening of the radial depth of the edgewise wound strip material, a yoke member is formed of powdered iron. This yoke member is magnetically associated or closely coupled magnetically with the edgewise wound strip material, and in the core member of the stator illustrated in Fig. 2 a powdered core member 12 is contiguous with the edgewise wound strip material. The edgewise wound portion may be mechanically held to the powdered iron yoke portion of the core member in any suitable manner, such as by keying. In order to accomplish this keying operation, the strip material in Fig. 1 has protruding dovetail portions 13 which extend into the powdered iron yoke portion, as will be seen in Fig. 2.

The powdered iron portion of the core member may be formed of silicon scrap, iron powder, or iron ore held together by a suitable binder such as phenolic condensation product or compressed and sintered without a binder. The powdered iron core may be formed of any one of the materials as listed above, alone or combinations of any of them. If it is desired, the powdered iron portion may be laminated so as to help to minimize losses.

In Fig. 3 I have illustrated a rotor of a dynamo-electric machine formed of edgewise wound strip material 14 and a powdered iron yoke member 15. The edgewise wound strip material before it is wound may be punched at 16 to form suitable passageways into which the rotor winding may be placed.

In Fig. 4 I have illustrated the stationary member of a dynamo-electric machine having a powdered iron yoke member 17 and end shields 18 which are also formed of powdered iron. The edgewise wound material is shown at 19.

While I have described my invention as having particular application to edge-wise wound core members, however, it will be apparent that my invention also has application to other types of core members, such as a laminated core member in combination with a powdered iron yoke member.

In view of the foregoing it will be seen that I have provided a core member for a dynamo-electric machine or other electrical apparatus which is simple in construction, efficient magnetically, and economical to manufacture.

Modifications of the particular arrangements which I have disclosed embodying my invention will occur to those skilled in the art, so that I do not desire my invention to be limited to the particular arrangement set forth and I intend in the appended claims to cover all modifications which do not depart from the spirit and scope of my invention.

What I claim as new and desire to secure by Letters Patent of the United States is:

1. A core for electrical apparatus including a laminated portion and a powdered iron portion, said portions being contiguous with each other.

2. A core for a dynamo-electric machine including a laminated portion and a powdered iron portion, said portions being closely coupled magnetically with each other.

3. A core for electrical apparatus including an edgewise wound portion and a powdered iron portion, said portions being contiguous with each other.

4. A core for a dynamo-electric machine including teeth formed of edgewise wound magnetic strip material and a yoke of powdered iron contiguous therewith.

5. A core for a dynamo-electric machine including teeth formed of a thin strip of ferromagnetic material in the form of a fine-pitch helix, the radial depth of said strip being only sufficient to form a mechanically rigid structure at the root of said teeth, and a powdered iron yoke, said yoke being contiguous with said helix.

6. A core for a dynamo-electric machine including teeth formed of a thin strip of ferromagnetic material in the form of a fine-pitch helix and arranged with the teeth forming edge presented toward the axis of said core, the radial depth of said strip being only sufficient to form a mechanically rigid structure at the root of said teeth, and a powdered iron yoke, said edge of said helix opposite said teeth forming edge being contiguous with said powdered iron yoke.

7. A core for a dynamo-electric machine including teeth formed of a thin strip of ferromagnetic material in the form of a fine-pitch helix and arranged with the teeth forming edge presented toward the axis of said core, the radial depth of said strip being only sufficient to form a mechanically rigid structure at the root of said teeth, and a powdered iron yoke, said edge of said helix opposite said teeth forming edge being keyed with said powdered iron yoke.

8. A core for a dynamo-electric machine including an edgewise wound portion and a powdered iron portion, said edgewise wound portion being keyed to said powdered iron portion.

9. A core for the stator of a dynamo-electric machine including teeth formed of a thin strip of ferro-magnetic material in the form of a fine-pitch helix and arranged with the teeth forming edge presented toward the axis of said core, the radial depth of said strip being only sufficient to form a mechanically rigid structure at the root of said teeth, and a powdered iron yoke, said edge of said helix opposite said teeth forming edge being contiguous with said powdered iron yoke.

10. A core for a rotor of a dynamo-electric machine including teeth formed of a thin strip of ferro-magnetic material in the form of a fine-pitch helix and arranged with the teeth forming edge presented away from the axis of said core, the radial depth of said strip being only sufficient to form a mechanically rigid structure at the root of said teeth, and a powdered iron yoke, said edge of said helix opposite said teeth forming edge being contiguous with said powdered iron yoke.

11. A dynamo-electric machine having a stationary member including end shields and a core member, said core member comprising an edgewise wound portion and a powdered iron portion, said end shields being formed of powdered iron.

12. A core for electrical apparatus including a laminated portion and a powdered iron portion, said portions being contiguous with each other, said powdered iron portion being laminated.

13. A core for a dynamo-electric machine including an edgewise wound portion and a powdered iron portion, said edgewise wound portion being keyed to said powdered iron portion, said powdered iron portion being laminated.

ROBERT T. REARDON.